United States Patent [19]

Ferrandino et al.

[11] Patent Number: 5,569,697
[45] Date of Patent: Oct. 29, 1996

[54] TIRE TREAD COMPOSITION

[75] Inventors: Mark P. Ferrandino, Danbury; Sung W. Hong, Chesire; George T. McKenzie, Watertown, all of Conn.

[73] Assignee: Uniroyal Chemical Company, Inc., Middlebury, Conn.

[21] Appl. No.: 437,260

[22] Filed: May 8, 1995

[51] Int. Cl.$^6$ .............................. C08K 3/04; C08K 3/36
[52] U.S. Cl. ..................... 524/492; 524/493; 524/495; 524/496
[58] Field of Search .................... 524/492, 493, 524/495, 496

[56] References Cited

U.S. PATENT DOCUMENTS

| | | | |
|---|---|---|---|
| 4,433,094 | 2/1984 | Ogawa | 524/496 |
| 4,616,685 | 10/1986 | Harakon | 152/209 |
| 4,788,241 | 11/1988 | Cornell | 524/311 |
| 4,791,178 | 12/1988 | Fujimaki | 525/322.6 |
| 4,866,131 | 9/1989 | Fujimaki | 525/96 |
| 4,894,420 | 1/1990 | Scriver | 525/237 |

FOREIGN PATENT DOCUMENTS 9220737  11/1992  WIPO .

OTHER PUBLICATIONS

World Patent Index (Derwent Information LTD) 88–358591(50) Abstract of JP 63270751 A Nov. 26, 1988.
Chemical Abstracts 111:24802, Abstract of Japanese Patent JP 63270751 A2, published on Nov. 26, 1988.
Wolff et al, "Silica–Based Tread Compounds: Background and Performance", Tyretech '93, Basel/Switzerland, Oct. 28–29. 1993.

*Primary Examiner*—Edward J. Cain
*Attorney, Agent, or Firm*—Daniel Reitenbach

[57] ABSTRACT

Tire tread compositions comprising a) a first rubber component comprising about 60–90 parts of styrene butadiene rubber (SBR) comprising less than 20 percent by weight of styrene, per hundred parts of rubber (phr);

b) a second rubber component comprising about 10–40 phr of nitrile-butadiene rubber (NBR);

c) 30–80 phr of carbon black;

d) 10–20 phr of silica;

e) 1–3 phr of a silane coupling agent; and, optionally, f) a third rubber component comprising about 10–30 phr of a high cis polybutadiene rubber (cis BR). The tire tread compositions provide tires with excellent wet traction and low rolling resistance.

11 Claims, No Drawings

TIRE TREAD COMPOSITION

FIELD OF THE INVENTION

This invention relates to tire tread compositions providing tires with excellent wet traction and low rolling resistance. More particularly, this invention relates to tire tread compositions comprising styrene butadiene rubber (SBR) comprising less than 20% styrene, nitrile-butadiene rubber (NBR), carbon black, silica, a silane coupling agent and, optionally, a high cis polybutadiene rubber (cis BR).

BACKGROUND OF THE INVENTION

The treads of modern tires must meet performance standards which require a broad range of desirable properties. Rubber compositions suitable for tire treads should exhibit not only desirable strength and elongation, particularly at high temperatures, but also good cracking resistance, good abrasion resistance, desirable skid resistance and low tan delta values at low frequencies for desirable rolling resistance. Additionally, a high complex dynamic modulus is necessary for maneuverability and steering control.

Major tire manufacturers have developed tread compounds which provide lower rolling resistance for improved fuel economy and better skid/traction for a safer ride. Most passenger tread compounds contain either solution styrene butadiene rubber (S-SBR) or emulsion styrene butadiene rubber (E-SBR) blended with either high cis polybutadiene (cis BR) or high vinyl content polybutadiene (HV-BR). Three types of performance are important in tread compounds. They include good wear resistance, good traction and low rolling resistance. Therefore, it is important to select the appropriate SBR to develop a tire tread with good overall performance.

Compounds which provide good wet traction should have high tangent delta values at low temperatures (0° C.), while compounds having low rolling resistance should have low tangent delta values at high temperatures (50°–100° C.). These two properties are very difficult to obtain from an E-SBR/Cis BR blended tire compound since wet skid/traction and low rolling resistance are contradictory to each other. For example, low glass transition high cis polybutadiene rubber has very poor wet skid/traction, while it provided lower rolling resistance and good wear resistance. High styrene content E-SBR has a high glass transition temperature which results in high tangent delta at 0° C. and 50°–100° C. respectively. It provides higher rolling resistance, good wet traction and fast wear.

It has been reported that wear is related with the styrene content of SBR in a tread compound. High styrene SBR is often used in high performance tread to improve skid/traction and provide a better handling and safer tire. This performance comes at the expense of rolling resistance and tread wear properties.

International Patent Application WO 92/20737 describes a tire tread composition comprising i) a first rubber component comprising about 5–15 parts of nitrile-butadiene rubber per hundred parts of rubber (phr); ii) a second rubber component comprising about 20–95 phr of styrene butadiene rubber; and iii) a third rubber component comprising 0–47 phr of high cis polybutadiene rubber. U.S. Pat. No. 4,894,420 describes tire treads having cis 1,4-polyisoprene, at least one copolymer containing acrylonitrile rubber, and a rubber based on polybutadiene. U.S. Pat. No. 4,791,178 describes a tire tread composition of at least 30% of a conjugated diene-monovinyl aromatic hydrocarbon copolymer. U.S. Pat. No. 4,866,131 describes a rubber composition for use in tires containing a high styrene SBR. U.S. Pat. No. 4,616,685 describes tire treads containing a plasticizing ester, a styrene-butadiene rubber having more than 25% styrene by weight, and a second rubber ingredient chosen from butyl rubber, butyl halide rubber, butadiene/acrylonitrile copolymer, or mixtures thereof. U.S. Pat. No. 4,433,094 describes tire treads having a particular type of carbon black, styrene-butadiene rubber having a specific bound styrene content, and optionally another diene rubber. U.S. Pat. No. 4,788,241 describes a curing system comprised of a curative, a paraffin wax and pentaerythritol tetrastearate, which is said to cure rubbers such as natural rubber, cis-polyisoprene, polybutadiene, solution and emulsion poly(styrene-butadiene), EPDM, poly(acrylonitrile-butadiene), and mixtures thereof. Japanese Patent No. JP 63270751 A and JP 63270751 A2 describe tire tread compositions having abrasion resistance and good traction, comprising SBR containing 25–60% styrene, nitrile rubber, carbon black, silica and silane couplers.

The purpose of this invention is to provide a tire tread composition which has excellent wet traction and low rolling resistance.

SUMMARY OF THE INVENTION

This invention relates to a tire tread composition comprising
  a) a first rubber component comprising about 60–90 parts of styrene butadiene rubber (SBR) comprising less than 20 percent by weight of styrene, per hundred parts of rubber (phr);
  b) a second rubber component comprising about 10–40 phr of nitrile-butadiene rubber (NBR);
  c) 30–80 phr of carbon black;
  d) 10–20 phr of silica;
  e) 0.5–3 phr of a silane coupling agent; and, optionally,
  f) a third rubber component comprising about 10–30 phr of a high cis polybutadiene rubber (cis BR).

The compositions of this invention can also comprise suitable amounts of other ingredients such as aromatic oil, zinc oxide, stearic acid, sulfur, sulfur donor compounds, sulfur cure accelerators, waxes, antiozonants, and the like, suitable for use in rubber compounding.

The tire tread compositions of the present invention exhibit excellent wet traction and low rolling resistance.

DESCRIPTION OF THE INVENTION

Preferably, this invention relates to a tire tread composition comprising
  a) a first rubber component comprising about 80–90 parts of styrene butadiene rubber (SBR) comprising less than 20 percent by weight of styrene, per hundred parts of rubber (phr);
  b) a second rubber component comprising about 10–20 phr of nitrile-butadiene rubber (NBR);
  c) 40–50 phr of carbon black;
  d) 10–15 phr of silica; and
  e) 1–2 phr of a silane coupling agent.

This invention additionally preferably relates to a tire tread composition comprising
  a) a first rubber component comprising about 60–75 phr, more preferably about 60 phr, of SBR comprising less than 20 percent by weight of styrene;

b) a second rubber component comprising about 10–15 phr, more preferably about 10 phr, of NBR;

c) a third rubber component comprising about 10–30 phr, more preferably about 30 phr, of a high cis BR.

d) 40–50 phr of carbon black;

e) 10–15 phr of silica; and f) 1–2 phr of a silane coupling agent.

The rubber components useful in the composition of the present invention are all known and commercially available.

Any emulsion or, preferably, solution SBR comprising less than 20 percent by weight of styrene, can be used in the composition of the present invention. Preferred is a solution SBR with a bound styrene content of between about 15 percent to about 18 percent by weight. Examples of commercially available solution SBR comprising less than 20 percent by weight of styrene are NS112 (15% styrene) (Nippon Zeon) and Duradene 711 (18% styrene) (Firestone).

The NBR useful in the composition of this invention, can be manufactured as either a hot or cold type, as determined by the temperature at which the polymerization is controlled, which, generally, is about 40° C. and 5° C., respectively. See. e.g., Kirk-Othmer, Encyclopedia of Chemical Technology, Third Edition, Volume 8, p.539 (John Wiley & Sons, Inc., 1979). Cold NBR is preferred in the composition of this invention. A particularly suitable cold NBR material, having an acrylonitrile content of 38.5–40.9%, is sold under the name PARACRIL® CJLT ("CJLT") (Uniroyal Chemical Company, Inc.). Another suitable cold NBR material is known as PARACRIL® BJLT ("BJLT") (Uniroyal Chemical Company, Inc.), having an acrylonitrile content of 31.4 to about 33.8%. A particularly preferred Paracril is X3542 which possesses from about 31 to 33% acrylonitrile.

Silica, such as fumed silicas, useful in the composition of this invention, are known and are commercially available and can contain differing structures, surface areas, and particle sizes. An example of a preferred silica would be Hi-Sil® 233, available from PPG Industries.

Silane coupling agents useful in the compostion of this invention are known. Examples of useful silane coupling agents include N-β-(aminoethyl)-γ-aminopropyltrimethoxysilane, γ-aminopropyltriethoxy silane, bis (β-hydroxyethyl)-γ-aminopropyltriethoxy silane, β-(3,4-epoxycyclohexyl)ethyltrimethoxy silane, γ-glycidoxypropyltrimethoxy silane, γ-methacryloxypropyltrimethoxy silane, vinyl trichlorosilane, vinyl triethoxysilane, and vinyl tris(β-methoxyethyl) silane. A preferred silane coupling agent is bis-(3-triethoxysilylpropyl)-tetrasulfide, also known and sold as SI69® (DeGussa AG).

The preferred carbon black useful in the composition of this invention is any carbon black which has a $N_2SA$ of between about 70–140 $m^2/g$ and a DBP of about 100 to about 140 cc/100 g. ($N_2SA$ is a measure of the nitrogen specific surface area as determined by gas adsorption and DBP is a measure of the structure as determined by dibutyl phthalate oil absorption). Examples of preferred carbon black useful in the composition of this invention is N351 and N339 carbon black.

The optional third rubber component can comprise any cis BR which is greater than 95% cis. Examples of preferred cis BR which are commercially available include Cisdene 1203 and 1207 (American Synthetic Rubber).

The curative system employed in the present invention for the rubber portion can be any suitable system known in the art, and may include sulfur and/or a sulfur donor compound, and at least one sulfur cure accelerator.

If sulfur is used, it is preferably present in an amount of between about 1 to about 3 parts per hundred parts of rubber.

The sulfur donor compounds which may be employed in conjunction with or in the alternative to, sulfur are well known to those skilled in the art of rubber compounding. Illustrative of such sulfur donor compounds are 2-(4-morpholinyldithio)-benzothiazole, tetramethylthiuram disulfide, tetraethylthiuram disulfide, dipentamethylene thiuram hexasulfide, N,N'-caprolactam disulfide and the like.

The sulfur cure accelerators which may be employed include thioureas, such as N,N'-dibutylthiourea, 2-mercaptoimidazoline, tetramethylthiourea and the like; guanidine derivatives, such as N'N'-diphenylguanidine and the like; xanthates, such as zinc dibutylxanthate and the like; dithiocarbamates, such as zinc dibutyldithio carbamate, sodium diethyldithiocarbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram disulfide and the like; heterocyclics, such as mercaptobenzimidazole, mercaptobenzothiazole, 2,2-dibenzothiazoyl disulfide, zinc 2-mercaptobenzothiazole and the like; and sulfenamides, such as N-oxydiethylene-2-benzothiazolesulfenamide, n-t-butylbenzothiazolesulfenamide, N-cyclohexyl-2-benzothiazolesulfenamide, N,N'-diisopropyl- 2-benzothiazylsulfenamide, and the like. Moreover, mixtures of two or more sulfur cure accelerators may be employed in the curing agent of this invention. The preferred accelerators are thiazoles and sulfenamides, with sulfenamides being particularly preferred. The sulfur cure accelerator is generally present in amounts of between about 0.1 parts and about 5 parts per 100 parts of rubber, with preferably between about 0.3 parts and about 3.0 parts of accelerator per 100 parts of rubber being present. Most preferably, between about 0.3 parts and about 1.5 parts of accelerator per 100 parts of rubber are employed.

In addition to the rubber components and the curing agents described above, the composition of this invention can further comprise zinc oxide, reinforcing agents, fillers, processing aids, extender oils, plasticizers, antidegradants, and the like, all of which additional components are well known to those skilled in the rubber art.

Preferably, between about 2 and about 10 parts of zinc oxide per hundred parts of rubber are employed, although amounts in excess of 10 parts may also be employed. Most preferably, between about 3 and about 5 parts of zinc oxide per 100 parts of rubber are present.

The following Examples are provided to illustrate the present invention.

EXAMPLES

Examples 1–3 and Comparative Examples A through F

Employing the ingredients listed in Table 1, which are listed in parts per hundred rubber by weight, several rubber compositions were compounded in a Banbury mixer. In the first pass were added the polymers, carbon black, silica, coupling agent, and oil. Each batch was mixed until the materials were incorporated and thoroughly dispersed and discharged from the mixer. The discharge temperature ranged from 140° C. to 160° C. Each batch was cooled and was then reintroduced into the mixer for a second pass.

In the second step, stearic acid, zinc oxide, resins, and antidegradants were added to each compostion. The second pass was shorter and discharge temperatures generally ran between 110°–120° C.

In the third step, the curatives, namely tire sulfur and a delayed action accelerator, were added. The discharge temperature of the curative pass was 100° C. maximum.

Each compounded stock resulting from the third step was then sheeted out and samples were cut for cure. The samples were cured as indicated in Table 2 and their physical properties evaluated.

The method described in DIN 53516, according to ISO 4649, was used to measure abrasion. Tangent delta, relating viscoelastic properties such as tan delta, G', and G", were obtained using a Dynamic Viscoelastic Tester made by Rheometrics, Inc. The G values represent shear, or twisting strain. To determine these viscoelastic properties, the samples were subjected to rectangular torsion.

Tangent delta is expressed by a ratio of the measurement of energy lost as heat (loss modulus) versus the energy stored and released (storage modulus). This ratio represents the mechanical loss angle. The mechanical loss angle is expressed as G"/G'.

Specifically, good wet traction is predicted by a high value for G" (loss modulus) and tan delta at 0° C. Low rolling resistance is predicted by low tangent delta values at 50° C. and higher temperatures. Good (high) wet traction and low rolling resistance usually require compromise on the part of the rubber compounder. Prior to the present invention, it was difficult to obtain both properties in the same tire tread composition.

Other methods used include Tensile Strength, Elongation, and Modulus which were measured following procedures described in ASTM D412. Tensile and modulus values are given in psi units. Tear Die C values are in pounds per inch (ppi).

TABLE 1

| | RECIPES | | | | | | | | |
|---|---|---|---|---|---|---|---|---|---|
| | COMPARATIVE EXAMPLES | | | | | | EXAMPLES | | |
| | A | B | C | D | E | F | 1 | 2 | 3 |
| FIRST PASS | | | | | | | | | |
| S-SBR[1] | 100 | 90.0 | 100.0 | 90.0 | 70.0 | 60.0 | 90.0 | 90.0 | 60.0 |
| NBR[2] | — | 10.0 | — | 10.0 | — | 10.0 | 10.0 | 10.0 | 10.0 |
| HVBR[3] | — | — | — | — | 30.0 | — | — | — | — |
| cis-BR[4] | — | — | — | — | — | 30.0 | — | — | 30.0 |
| Carbon Black (N-351) | 55.0 | 55.0 | 55.0 | 55.0 | 55.0 | 55.0 | 43.0 | 43.0 | 43.0 |
| Naphthenic Oil (Sunthene 4240) | 12.0 | 12.0 | 12.0 | 12.0 | 12.0 | 12.0 | 12.0 | 12.0 | 12.0 |
| Silica (Hi-Sil 233) | — | — | — | — | — | — | 13.3 | 13.3 | 13.3 |
| Coupling Agent (SI 69) | — | — | — | — | — | — | 1.5 | 1.5 | 1.5 |
| SECOND PASS | | | | | | | | | |
| Zinc Oxide (KADOX 911C) | 8.0 | 3.0 | 3.0 | 3.0 | 3.0 | 3.0 | 3.0 | 3.0 | 3.0 |
| Antiozonant (FLEXZONE 7P) | 1.0 | 1.0 | 1.0 | 1.0 | 1.0 | 1.0 | 1.0 | 1.0 | 1.0 |
| Sunproof Improved Wax | 0.5 | 0.5 | 0.5 | 0.5 | 0.5 | 0.5 | 0.5 | 0.5 | 0.5 |
| CURATIVE PASS | | | | | | | | | |
| Delayed Action Accelerator (DELAC NS) | 1.2 | 1.2 | 1.2 | 1.2 | 1.2 | 1.2 | 1.7 | 1.7 | 1.7 |
| Tire Sulfur | 1.5 | 1.5 | 1.5 | 1.5 | 1.5 | 1.5 | 1.5 | 1.5 | 1.5 |

Notes for Table 1:
[1] Solution SBR: NS112, Nippon Zeon (A,B,1); Duradene 711, Firestone (C–F,2–3)
[2] Nitrile Rubber, Paracril X3542 (A,B,1); Paracril X3754 (C–F,2–3), Uniroyal Chemical Co., Inc.
[3] High vinyl polybutadiene, Duradene 712, Firestone
[4] High cis-polybutadiene, Cisdene 1203, American Synthetic Rubber

TABLE 2

| | PROCESSING DATA | | | | | | | | |
|---|---|---|---|---|---|---|---|---|---|
| | COMPARATIVE EXAMPLES | | | | | | EXAMPLES | | |
| | A | B | C | D | E | F | 1 | 2 | 3 |
| Mooney Viscosity ML 1 + 4 @ 100° C. | 75 | 76 | 87 | 89 | 76 | 74 | 79 | 82 | 80 |

TABLE 2-continued

PROCESSING DATA

|  | COMPARATIVE EXAMPLES | | | | | | EXAMPLES | | |
| --- | --- | --- | --- | --- | --- | --- | --- | --- | --- |
|  | A | B | C | D | E | F | 1 | 2 | 3 |
| Mooney Scorch[1] | | | | | | | | | |
| 3 point rise (min.) | 21 | 16 | 24 | 15 | 25 | 14 | 16 | 15 | 13 |
| Cure index (min.) | 2.0 | 2.9 | 6 | 3 | — | 3 | 3.3 | 3 | 2 |
| Rheometer (177° C.) | | | | | | | | | |
| Ts1 (min) | 2.00 | 1.68 | 1.82 | 1.53 | 1.87 | 1.52 | 1.68 | 1.55 | 1.50 |
| T50 (min) | 3.43 | 2.79 | — | — | — | — | 3.09 | — | — |
| T90 (min) | 4.36 | 3.40 | 4.24 | 3.11 | 4.38 | 3.09 | 4.24 | 3.58 | 3.39 |
| Min. Torque ML | | | | | | | | | |
| (lb-in) | 4.90 | 5.42 | 8.44 | 8.83 | 7.07 | 7.69 | 6.01 | 8.29 | 8.49 |
| (dNm) | 5.54 | 6.12 | 9.54 | 9.98 | 7.99 | 8.69 | 6.79 | 9.37 | 9.59 |
| Max. Torque MH | | | | | | | | | |
| (lb-in) | 41.5 | 4.02 | 38.2 | 40.0 | 33.7 | 38.5 | 45.4 | 42.0 | 43.7 |
| (dNm) | 46.9 | 45.4 | 43.2 | 45.2 | 38.1 | 43.5 | 51.3 | 47.5 | 49.4 |

[1]Small rotor @ 132° C.

TABLE 3

PHYSICAL PROPERTIES
Cured 8'/10' @ 177° C.[1]

|  | COMPARATIVE EXAMPLES | | | | | | EXAMPLES | | |
| --- | --- | --- | --- | --- | --- | --- | --- | --- | --- |
|  | A | B | C | D | E | F | 1 | 2 | 3 |
| Tensile | | | | | | | | | |
| (Psi) | 3110 | 2830 | 3140 | 3210 | 2900 | 2770 | 2800 | 2900 | 2650 |
| (MPa) | 21.1 | 19.2 | 21.4 | 21.8 | 19.7 | 18.8 | 19.0 | 19.7 | 18.0 |
| 100% Modulus | | | | | | | | | |
| (Psi) | 290 | 330 | 250 | 290 | 290 | 250 | 330 | 320 | 340 |
| (MPa) | 20.0 | 2.2 | 1.7 | 2.0 | 2.0 | 1.7 | 2.2 | 2.2 | 2.3 |
| 200% Modulus | | | | | | | | | |
| (Psi) | 850 | 920 | 710 | 840 | 880 | 670 | 940 | 840 | 890 |
| (MPa) | 5.8 | 6.3 | 4.8 | 5.7 | 6.0 | 4.6 | 6.4 | 5.7 | 6.1 |
| 300% Modulus | | | | | | | | | |
| (Psi) | 1690 | 1780 | 1480 | 1660 | 1710 | 1360 | 1780 | 1630 | 1690 |
| (MPa) | 11.5 | 12.1 | 10.1 | 11.3 | 11.6 | 9.2 | 12.1 | 11.1 | 11.5 |
| % Elongation at break | 460 | 430 | 510 | 470 | 460 | 490 | 430 | 440 | 430 |
| Shore A hardness | 65 | 66 | 65 | 65 | 65 | 65 | 68 | 66 | 69 |
| Die C - Tear | | | | | | | | | |
| (PPi) | 210 | 200 | 200 | 220 | 190 | 210 | 210 | 230 | 220 |
| (KN/m) | 37 | 35 | 35 | 39 | 33 | 37 | 37 | 40 | 39 |
| Touser Tear | | | | | | | | | |
| (PPi) | 43 | 52 | 89 | 180 | 44 | 210 | 40 | 180 | 180 |
| (KN/m) | 8 | 9 | 16 | 31 | 8 | 37 | 7 | 31 | 31 |
| DIN Abrasion[2] - Relative Volume Loss[3] | 99 | 102 | 104 | 99 | 121 | 92 | 99 | 98 | 84 |

Notes for Table 3:
[1]Example 1 and Comparative Example A and B cured 10'; all others cured for 8'.
[2]Example 1 and Comparative Example A and B cured 12' @ 177° C.; all others cured for 10' @ 177° C.
[3]Lower volume loss indicates better abrasion resistance.

TABLE 4

VISCOELASTIC PROPERTIES
10 Hertz, 1% Strain, Cured 8'/10' @ 177° C.[1]

|  | COMPARATIVE EXAMPLES | | | | | | EXAMPLES | | |
| --- | --- | --- | --- | --- | --- | --- | --- | --- | --- |
|  | A | B | C | D | E | F | 1 | 2 | 3 |
| G' × 10$^7$ | 3.59 | 5.30 | 4.66 | 6.55 | 4.77 | 5.51 | 5.33 | 7.38 | 6.63 |
| G" × 10$^7$ | 0.468 | 0.989 | 0.72 | 1.59 | 0.835 | 1.33 | 1.03 | 2.04 | 1.68 |
| Tan delta @ 0° C. | 0.131 | 0.187 | 0.154 | 0.242 | 0.175 | 0.242 | 0.193 | 0.277 | 0.253 |
| G' × 10$^7$ | 2.87 | 3.89 | 3.62 | 4.39 | 3.62 | 3.86 | 3.94 | 4.61 | 4.41 |
| G" × 10$^7$ | 0.317 | 0.555 | 0.518 | 0.723 | 0.529 | 0.623 | 0.486 | 0.771 | 6.35 |
| Tan delta @ 25° C. | 0.111 | 0.144 | 0.143 | 0.165 | 0.146 | 0.161 | 0.123 | 0.161 | 0.144 |
| G' × 10$^7$ | 2.55 | 3.33 | 3.13 | 3.69 | 3.06 | 3.36 | 3.49 | 3.79 | 3.54 |
| G" × 10$^7$ | 0.246 | 0.420 | 0.415 | 0.458 | 0.341 | 0.458 | 0.341 | 0.504 | 0.41 |
| Tan delta @ 50° C. | 0.096 | 0.126 | 0.133 | 0.141 | 0.141 | 0.136 | 0.098 | 0.133 | 0.116 |
| G' × 10$^7$ | 2.32 | 2.93 | 2.82 | 3.16 | 2.65 | 2.92 | 3.01 | 3.24 | 3.08 |
| G" × 10$^7$ | 1.97 | 0.305 | 0.328 | 0.416 | 0.352 | 0.376 | 0.265 | 0.382 | 33.17 |
| Tan delta @ 75° C. | 0.086 | 0.104 | 0.116 | 0.132 | 0.133 | 0.129 | 0.088 | 0.118 | 0.103 |
| G' × 10$^7$ | 2.13 | 2.62 | 2.59 | 2.82 | 2.36 | 2.64 | 2.77 | 3.01 | 2.94 |
| G" × 10$^7$ | 0.166 | 0.253 | 0.273 | 0.348 | 0.298 | 0.317 | 0.227 | 3.27 | 0.255 |
| Tan delta @ 100° C. | 0.078 | 0.097 | 0.105 | 0.123 | 0.126 | 0.120 | 0.082 | 0.109 | 0.087 |

Notes for Table 4:
[1] Example 1 and Comparative Examples A and B were cured for 10'; all others cured 8'.

It can be seen from the viscoelastic properties of the tested compositions (Table 4) that the compositions of the present invention (Examples 1, 2 and 3) showed improved predicted wet traction with little or no loss in predicted rolling resistance.

For example, the results of the composition of Example 1 shows improvement in predicted rolling resistance (lower tangent delta values at 75° C.) when compared to the results obtained from the compositions of Comparative Examples A and B. Although lower tangent delta values at 0° C. for all three of these compounds can be considered the compromise for lower rolling resistance, the results obtained from the composition of Example 1 shows a reduction in the degree of this compromise by improving wet traction (higher tan delta at 0° C.).

Similarly, the compositions of Examples 2 and 3 show an increased tangent delta at 0° C. as compared to the compositions of Comparative Examples D and F, indicating better wet traction. At 75° C., the tan delta values are lower for the compositions of Examples 2 and 3, indicating desirable rolling resistance.

Accordingly, the compositions of the present invention unexpectedly improve the predicted wet traction of the tire tread made therefrom with little or no increase in predicted rolling resistance.

What is claimed is:

1. A tire tread composition comprising:
   a) a first rubber component comprising about 60–90 parts of styrene butadiene rubber (SBR) comprising less than 20 percent by weight of styrene, per hundred parts of rubber (phr);
   b) a second rubber component comprising about 10–40 phr of nitrile-butadiene rubber (NBR);
   c) 30–80 phr of carbon black;
   d) 10–20 phr of silica;
   e) 1–3 phr of a silane coupling agent; and, optionally,
   f) a third rubber component comprising about 10–30 phr of a high cis polybutadiene rubber (cis BR).

2. A tire tread compostion as recited in claim 1 comprising
   a) a first rubber component comprising about 80–90 phr of SBR comprising less than 20 percent by weight of styrene;
   b) a second rubber component comprising about 10–20 phr of NBR;
   c) 40–50 phr of carbon black;
   d) 10–15 phr of silica; and
   e) 1–2 phr of a silane coupling agent.

3. A tire tread composition as recited in claim 2 wherein the first rubber component comprises 80–90 phr of SBR comprising about 15 to about 18 percent by weight of styrene.

4. A tire tread composition as recited in claim 3 wherein the SBR is a solution SBR.

5. A tire tread composition as recited in claim 3 wherein the carbon black has a N$_2$SA of between about 70 to about 140 m$^2$/g and a DBP of about 100 to about 140 cc/100 g.

6. A tire tread compostion as recited in claim 1 comprising
   a) a first rubber component comprising about 60–90 phr of SBR comprising less than 20 percent by weight of styrene;
   b) a second rubber component comprising about 10–20 phr of NBR;
   c) a third rubber component comprising about 10–30 phr of a high cis BR;
   d) 40–50 phr of carbon black;
   e) 10–15 phr of silica; and
   f) 1–2 phr of a silane coupling agent.

7. A tire tread composition as recited in claim 6 wherein the first rubber component comprises about 60–90 phr of SBR comprising about 15 to about 18 percent by weight of styrene.

8. A tire tread composition as recited in claim 7 wherein the SBR is a solution SBR.

9. A tire tread composition as recited in claim 7 wherein the carbon black has a N$_2$SA of between about 70 to about 140 m$^2$/g and a DBP of about 100 to about 140 cc/100 g.

10. A tire tread composition as recited in claim 7 comprising
    a) a first rubber component comprising about 60 to about 75 phr of SBR comprising about 15 to about 18 percent by weight of styrene;
    b) a second rubber component comprising about 10 to about 15 phr of NBR;

c) a third rubber component comprising about 10–30 phr of a high cis BR;
d) 40–50 phr of carbon black;
e) 10–15 phr of silica; and
f) 1–2 phr of a silane coupling agent.

11. A tire tread composition as recited in claim 10 comprising
a) a first rubber component comprising about 60 phr of SBR comprising about 15 to about 18 percent by weight of styrene;
b) a second rubber component comprising about 10 phr of NBR;
c) a third rubber component comprising about 10–30 phr of a high cis BR;
d) 40–50 phr of carbon black;
e) 10–15 phr of silica; and
f) 1–2 phr of a silane coupling agent.

* * * * *